United States Patent
Grimm et al.

(10) Patent No.: US 6,317,868 B1
(45) Date of Patent: Nov. 13, 2001

(54) PROCESS FOR TRANSPARENTLY ENFORCING PROTECTION DOMAINS AND ACCESS CONTROL AS WELL AS AUDITING OPERATIONS IN SOFTWARE COMPONENTS

(75) Inventors: Robert Grimm; Brian N. Bershad, both of Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/168,125

(22) Filed: Oct. 7, 1998

Related U.S. Application Data (60) Provisional application No. 60/063,377, filed on Oct. 24, 1997.

(51) Int. Cl.[7] .......................................................... G06F 9/44
(52) U.S. Cl. ..................... 717/2; 717/3; 717/4; 713/201; 709/225; 709/246
(58) Field of Search ....................... 717/2–4, 11; 713/200, 713/201, 151, 156, 165, 167; 714/47; 705/51; 707/203, 200; 709/316, 315, 332, 246, 232, 225, 223

(56) References Cited

U.S. PATENT DOCUMENTS

| | | | |
|---|---|---|---|
| 5,359,659 | * 10/1994 | Rosenthal | 713/200 |
| 5,740,248 | * 4/1998 | Fieres et al. | 380/25 |
| 5,953,534 | * 9/1999 | Romer et al. | 717/11 |
| 5,974,549 | * 10/1999 | Golan | 713/200 |
| 5,983,348 | * 11/1999 | Ji | 713/200 |
| 5,991,877 | * 11/1999 | Luckenbaugh | 713/200 |
| 6,047,377 | * 4/2000 | Gong | 713/201 |
| 6,061,721 | * 5/2000 | Ismael et al. | 709/223 |
| 6,067,416 | * 5/2000 | Fraser | 717/11 |
| 6,092,194 | * 7/2000 | Touboul | 713/200 |
| 6,098,173 | * 8/2000 | Elgressy et al. | 713/201 |
| 6,108,788 | * 8/2000 | Moses et al. | 713/201 |
| 6,154,844 | * 11/2000 | Touboul et al. | 713/201 |
| 6,167,520 | * 12/2000 | Touboul | 713/200 |

OTHER PUBLICATIONS

"Finjan Announces a Personal JavaTM Firewall For Web Browsers–the SurfinShieldTM 1.6," Press Release of Finjan Releases SurfinShield, Oct. 21, 1996, 2 pages.*

(List continued on next page.)

*Primary Examiner*—Kakali Chaki
*Assistant Examiner*—Tuan Q. Dam
(74) *Attorney, Agent, or Firm*—Ronald M. Anderson (57) ABSTRACT

An original software component is modified in accordance with a site's security policy provisions prior to being executed by a component system or computer at the site. The original software component is intercepted by an introspection service running on a server or on the component system prior to execution on the component system. The introspection service analyzes the software component by parsing it, and based on the information it determines, a security policy service instructs an interposition service how to modify the software component so that it conforms to the security policy service requirements. The interposition service thus produces a modified software component by inserting code for security initialization and for imposing security operations on the original component operations. When the modified software component is executed, an enforcement service follows the security operations that were injected into the software component, which instruct the enforcement service on associating component system objects with security identifiers. For example, a security identifier is associated with the software component. In addition, the enforcement service determines when and how to perform access checks, protection domain transfers, and auditing during execution of the modified software component. Any of the services noted above can be executed by the computer intended to execute the software component or by a separate server.

36 Claims, 4 Drawing Sheets

OTHER PUBLICATIONS

"Finjan Announces Major Power Boost and New Features for SurfinShieldTM 2.0," Las Vegas Convention Center/Pavillion 5 P5551, Nov. 18, 1996, 3 pages.*

X.N. Zhang, "Secure Code Distribution," Computer, vol. 30, Issue 6, pp. 76–79, Jun. 1997.*

"Microsoft Chooses Trend, Micro to Provide Virus Protection for Proxy Server Users," Press Release of Trend Micro, Oct. 8, 1997, 2 pages.*

Bershad et al., "Protection is a Software Issue," Proceedings. IEEE Fifth Workshop on Hot Topics in Operating Systems, May 4–5, 1995, pp. 62–65.*

Bershad et al., "Extensibility, Safety and Performance in the SPIN Opereating System," Proceedings. Fifteenth ACM Symposium on Operating Systems Principles, Dec. 3–6, 1995, pp. 267–283.*

Dean et al., "Java Security: From HotJava to Netscape and Beyond," Proceedings, IEEE Symposium on Security and Privacy, May 6–8, 1996, pp. 190–200.*

Grimm et al., "Security for Extensible Systems," IEEE The Sixth Workshop on Hot Topics in Operating Systems, May 5–6, 1997, pp. 62–66.*

* cited by examiner

PROCESS FOR TRANSPARENTLY ENFORCING PROTECTION DOMAINS AND ACCESS CONTROL AS WELL AS AUDITING OPERATIONS IN SOFTWARE COMPONENTS

RELATED APPLICATIONS

This application is based on of U.S. provisional patent application, Ser. No. 60/063,377, filed Oct. 24, 1997, the benefit of the filing date of which is hereby claimed under 35 U.S.C. 119(e).

FIELD OF THE INVENTION

This invention generally pertains to managing computer programs executing on a network, and more specifically, to enforcing and auditing site-specific security provisions on software components of programs.

BACKGROUND OF THE INVENTION

Access to the Internet and to other computers has greatly increased the exposure of computers to software components of unknown and uncontrolled origin. When executed, these components from potentially untrusted sources may violate site-specific policies relating to security and access control. It is therefore important to provide a mechanism for handling the execution of such software components without unduly restricting their functionality.

Dynamically linked libraries, Java applets, and Active-X controls are good examples of software components that are widely used in modem computer systems and which often do not originate on a local, trusted computer, but instead are downloaded over a wide area network, or as it even more frequently the case, over the Internet. Typically, these software components execute only with the security services that are native to the particular software component system or the operating system that hosts the software components. However, the conventional environment or operating system in which these components are executed typically does not provide adequate security services for enforcing security on tightly integrated software components. For example, Active-X controls currently have no security constraints enforced upon them and normally execute with the same privileges as the program that loaded them.

While some component systems may allow a programmer to integrate fine-grained security enforcement into a software component while the component is being developed, it is generally not possible to access the component's source code to make changes to the security features at the site where the software component is later actually being used. Such changes may be particularly important if the security policy at the site where the component is used is substantially incompatible with that originally programmed into the component. However, the prior art does not provide any practical technique for making changes to the security policy implemented in such a component.

It would clearly be desirable to provide security administrators with a mechanism allowing them to control and observe the behavior of software components derived from a different source in regard to security and access issues. The control and observation of these components should thus be independent of the origin of the component, and independent of the security services of the hosting component system or operating system used to execute the software component. Further, it would be desirable for this mechanism to interpose access control checks, protection domain transfers, and auditing onto software component operations in a transparent manner that does not otherwise affect the functionality and execution of the software components. The auditing may encompass instrumenting the software components to provide information relating to the execution of the component as thus modified. Such information might provide an indication of the efficiency of the software component in completing a function, or the processor overhead that the software component creates, or indicate the number of times that it calls a routine, etc. The mechanism providing these functions should also separate the enforcement and auditing of the security policy from the actual site-specific security policy. By doing so, the approach should be appropriate for use in environments that rely on potentially insecure software components, as well as for use in environments in which security policies frequently change.

SUMMARY OF THE INVENTION

In accordance with the present invention, a method is defined for modifying a software component to conform to predefined security and access policies, which may include collecting measurement information related to the execution of the software component. These security and access policies may be specific to a site and applied generally by a server to software executing on any computer on a network on which the server is disposed, or may be specific to a single computer and applied by the computer to software prior to execution of the software on the computer.

The method includes the steps of providing a set of security and access policies that may be applicable during the execution of the software component; and analyzing the software component prior to its execution, to determine if any of the security and access policies are indeed applicable to the software component. The software component is then modified as necessary to conform to the security and access policies, producing a modified software component. Finally, the security and access policies are enforced on the modified software component during its execution on the computer.

The step of analyzing preferably includes the step of parsing code comprising the software component to determine abstractions or object types supported thereby, and the operations of the abstractions or object types. Any authorization information for the software component is determined and, based on the abstractions or object types, the operations of the abstractions or object types, and the authorization information, each security policy that is applicable to the software component is determined. The operations that require an access control check, a protection domain transfer, or auditing are also preferably determined.

The step of modifying comprises the steps of adding security initialization code to the software component, and imposing security operations on the software component consistent with the security and access policies. These security operations indicate how to associate component system objects with security identifiers, and when and how to perform access checks, protection domain transfers, and auditing. Note that as used in this specification and in the claims that follow, the following definitions apply: a "security identifier" is a token uniquely assigned to subjects, objects, or access modes in the system; the term "subjects" corresponds to users or groups of users; the term "objects" corresponds to system resources; and the term "access modes" corresponds to operations that a subject may perform on an object.

If the set of security and access policies is revised, the method further includes the step of changing the modified software component to provide a new modified software component that incorporates changes consistent with the revised set of security and access policies.

Preferably, a user who is executing the modified software component is authenticated before the software component is enabled to be executed. During execution of the software component, if a new thread of control is detected, a security identifier for a subject is identified, and an association between the subject and its security identifier are registered to facilitate enforcement of the security and access policies.

The step of enforcing the security and access policies includes the step of invoking an enforcement. service before the software component is executed. This enforcement service determines whether it must associate a component system object with a security identifier, and if so, establishes an association between the component system object and the security identifier.

The enforcement service also determines whether access checks should be performed on the modified software component prior to permitting it to execute. If the access checks are not successful, the enforcement service precludes the modified software component from executing. The enforcement service determines whether a protection domain transfer is required, and if so, determines a new security identifier for a subject.

An audit record is preferably created during the execution of the modified software component. The software component may also be modified to instrument it so that it enables information relating to the execution of the modified software component to be collected. Such information may be valuable for example, in evaluating the efficiency or processing overhead of the software component.

Optionally, a cache is provided to temporarily store data previously obtained from referencing the security and access policies relating to the software component. Storing the data in this cache makes the data more readily available during the step of enforcing the security and access policies. In addition, the data stored within the cache provides an association between either a security identifier and an object for the software component, or between a security identifier and an access mode, which are provided by reference to the security and access policies.

Another aspect of the present invention is directed to a computer system that includes a memory in which machine instructions and security and access policies are stored, and a processor that communicates with the memory. The processor executes the machine instructions, which cause the processor to carry out a plurality of functions. These functions are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
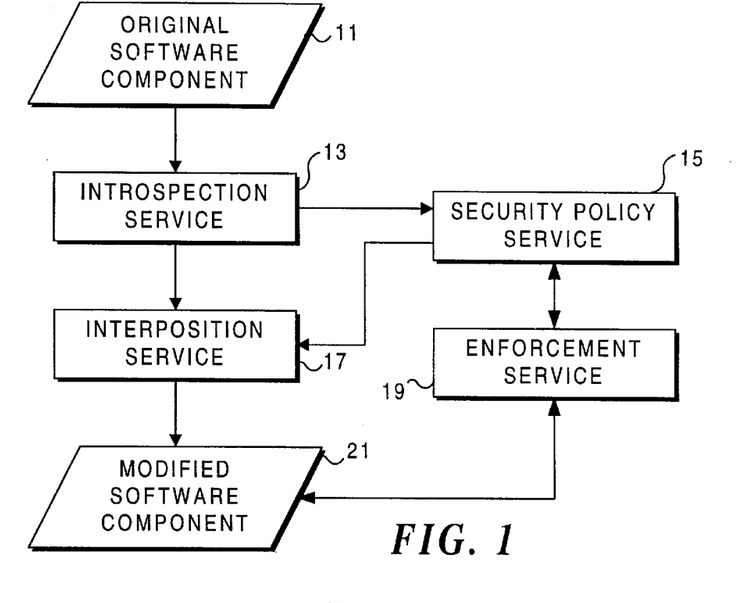
FIG. 1 is a block diagram providing an overview of the functional components of the present invention.

The present invention is directed to processing a software component 11, which is shown in FIG. 1, so that it can be modified as appropriate to implement a security policy as defined for the site where the software component is executed. For a software component that was originally created at a different location by other parties (who are typically unknown at the site where the software component is executed), there clearly is no practical way to insure that such components observe the security policy at that site. Accordingly, the present invention enables such a component to be modified when it is directed to a computer to be executed at the site, so that when executed, the modified software component is forced to adhere to the security policy at the site.

When software component 11 as originally created needs to be loaded for execution by a computer, the present invention provides an introspection service 13 that intercepts the software component for analysis. Based upon information determined by introspection service 13, a security policy service 15 instructs an interposition service 17, which is also included in the present invention, how to modify the original software component to adhere to the security policies of the site. The interposition service thus modifies the original software component by adding code to it producing a modified software component 21.

The modified software component is thus available for execution by the computer requesting execution of the original software component. During execution by this computer, the modified software component invokes an enforcement service 19, which maintains the computer's security state. The enforcement service responds to the system's security state, queries the security policy service for security decisions related to that state, and enforces them on the computer that is executing the modified software component.

It should be noted at this point that a server, which is different than the computer that will be executing the modified software component, can provide introspection service 13, security policy service 15, and interposition service 17. The services comprise functional components of the present invention that enable the modified software component to be created. Enforcement service 19 can be executed either by the computer executing the modified software component or by the server. Alternatively, all of the services could be implemented by a single computer that will execute the modified software component. It is also contemplated that any one or more of the introspection service, the interposition service, and the security policy service might be implemented by the computer that will be executing the modified software component instead of by the server, while any one or more of the remaining services is implemented by the server.

Figure 2:
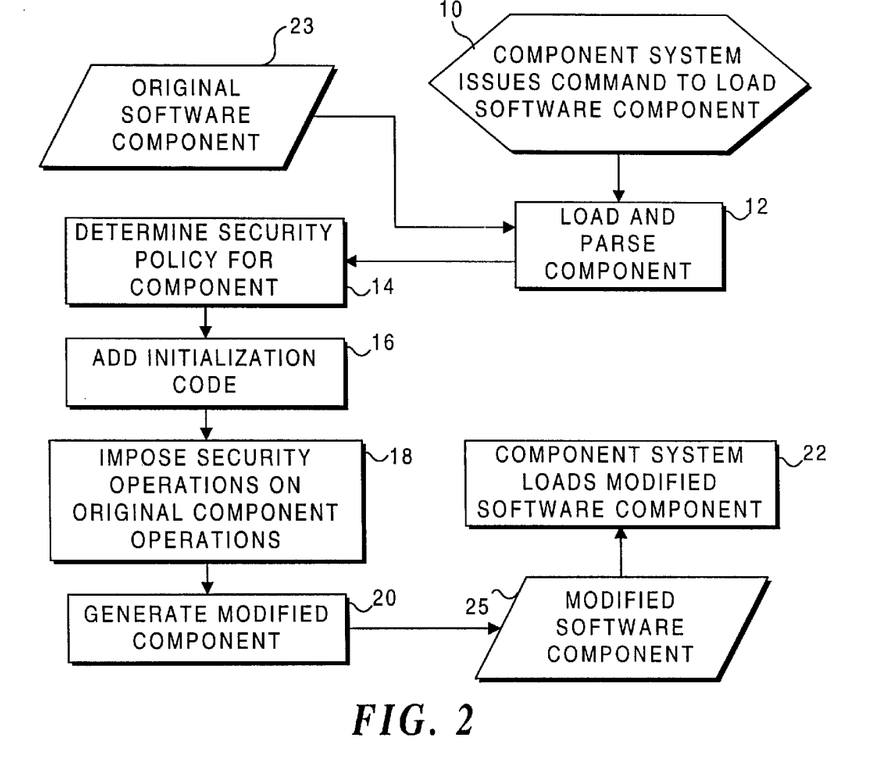
FIG. 2 is flow chart that illustrates the control and data flow logic applied when loading a software component that is to be modified in accord with the present invention.

Turning now to FIG. 2, the control and data flow for loading an original software component 23 and creating a modified software component 25 are illustrated. As shown in this Figure, a component system (i.e., a computer or workstation) to which the original software component was directed for execution issues a command to load the software component for execution. Instead, the original software component is loaded and parsed as indicated in a block 12. The present invention precludes the original software component from being executed prior to modification and instead intercepts the original software component to carry out the parsing step in block 12.

Introspection service 13 determines abstractions or object types that are supported by the software component, as well as the operations on these abstractions. It also determines authorization information for the software component, such as digital signatures that are required during execution of the component.

Based on the information produced by loading and parsing the component in block 12, security policy service 15 determines the security policy applicable to the software component, as indicated in a block 14. In particular, it determines the operations of the software component that require access control checks, protection domain transfers, and auditing. In regard to auditing, this step may determine whether the policies pertaining to collecting measurement information relating to the execution of the software component are applicable. Such information can be used, for example, in assessing the efficiency of the modified software component, or evaluating its performance and by instrumenting the software component to enable such information to be collected when the modified software component executes. The security policy service also determines the security identifier for the software component. Based upon these data, the security policy service instructs interposition service 17 to add security initialization code to the software component, as indicated in a block 16. A block 18 notes that the security policy service then imposes security operations on the original component that modify the operations originally coded into it. The code that is injected into the original software component in blocks 16 and 18 comprises calls to enforcement service 19, which instruct the enforcement service on how to manage the component system's security state and how to enforce security on the software component when it is executed as modified. In particular, the security operations that are injected into the software component to modify it instruct the enforcement service on how to associate component system objects with security identifiers. A security identifier is also associated with the software component itself. The security operations indicate to the enforcement service when and how to perform access checks, protection domain transfers, and auditing during execution of the modified software component. In a block 20, interposition service 17 generates modified software component 25. The modified software component can now be linked into the component system and loaded for execution, as indicated in a block 22.

If, during the lifetime of a software component in a component system, the security policy service determines that the security operations injected into a software component to create the modified software component need to be changed, security policy service 15 will instruct interposition service 17 to make further changes to the modified software component that are consistent with the changes to the security policy. The interposition service can then either create a new modified software component to replace the previous modified software component, or can change the modified software component in the component system directly to produce the new modified software component.

In addition to enabling authentication of a software component by determining the security identifier associated with the software component during its modification, the security policy service also authenticates users. On creation of a new subject, i.e., a new thread of control applicable to the software component, security policy service 15 determines a security identifier for the subject, and registers the association between the subject and its security identifier with enforcement service 19.

After a modified software component has been loaded (i.e., linked and activated) by a component system, it executes on the component system in the same manner it would have prior to modification by the present invention-with one important exception. The security operations that have been injected into the software component to create the modified version by the interposition service are now executed along with the code comprising the original software component.

Figure 3A:
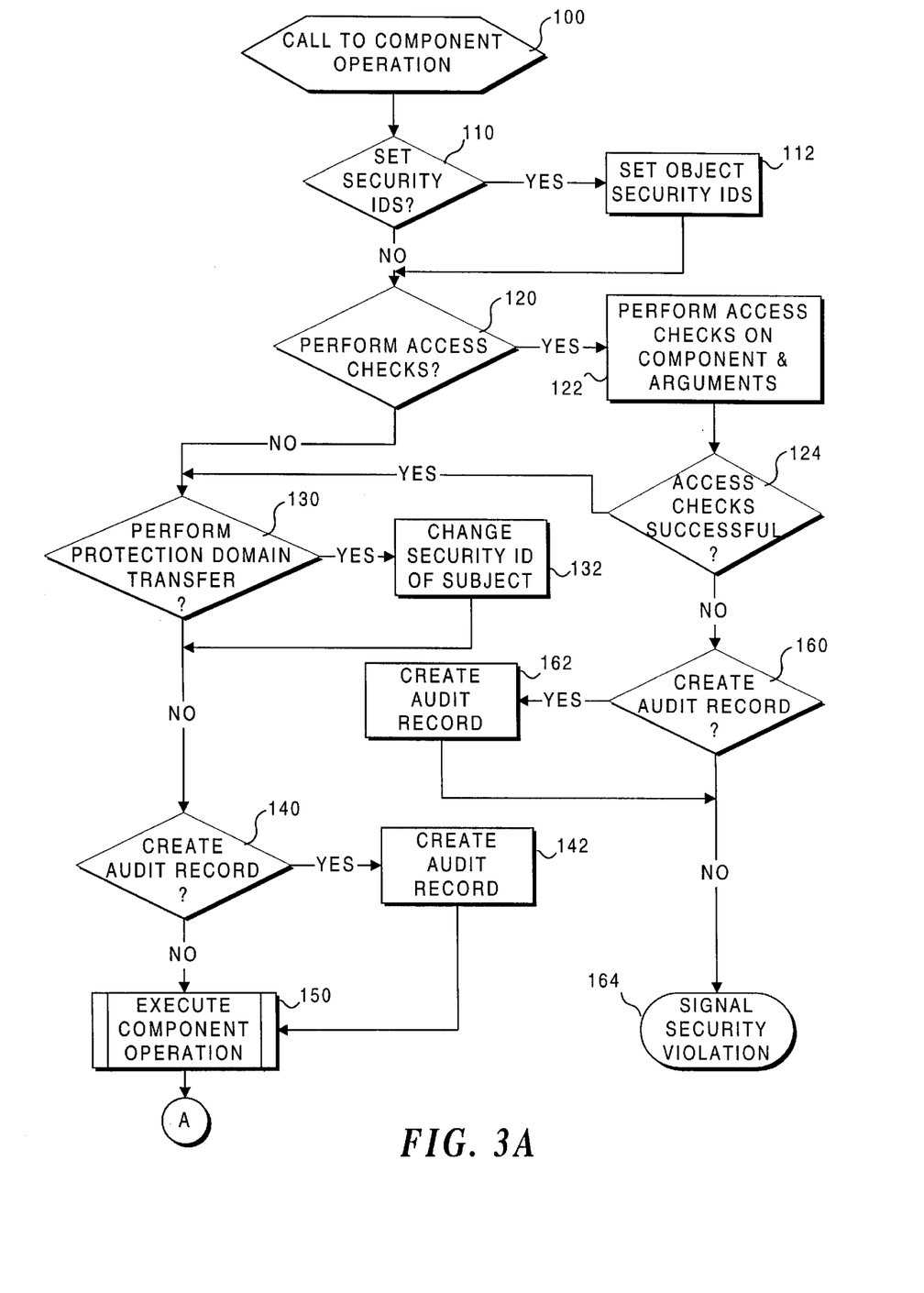
FIGS. 3A and 3B are a flow chart illustrating the logical steps implemented when a modified software is executed, to enforce security and access policies.
Figure 3B:
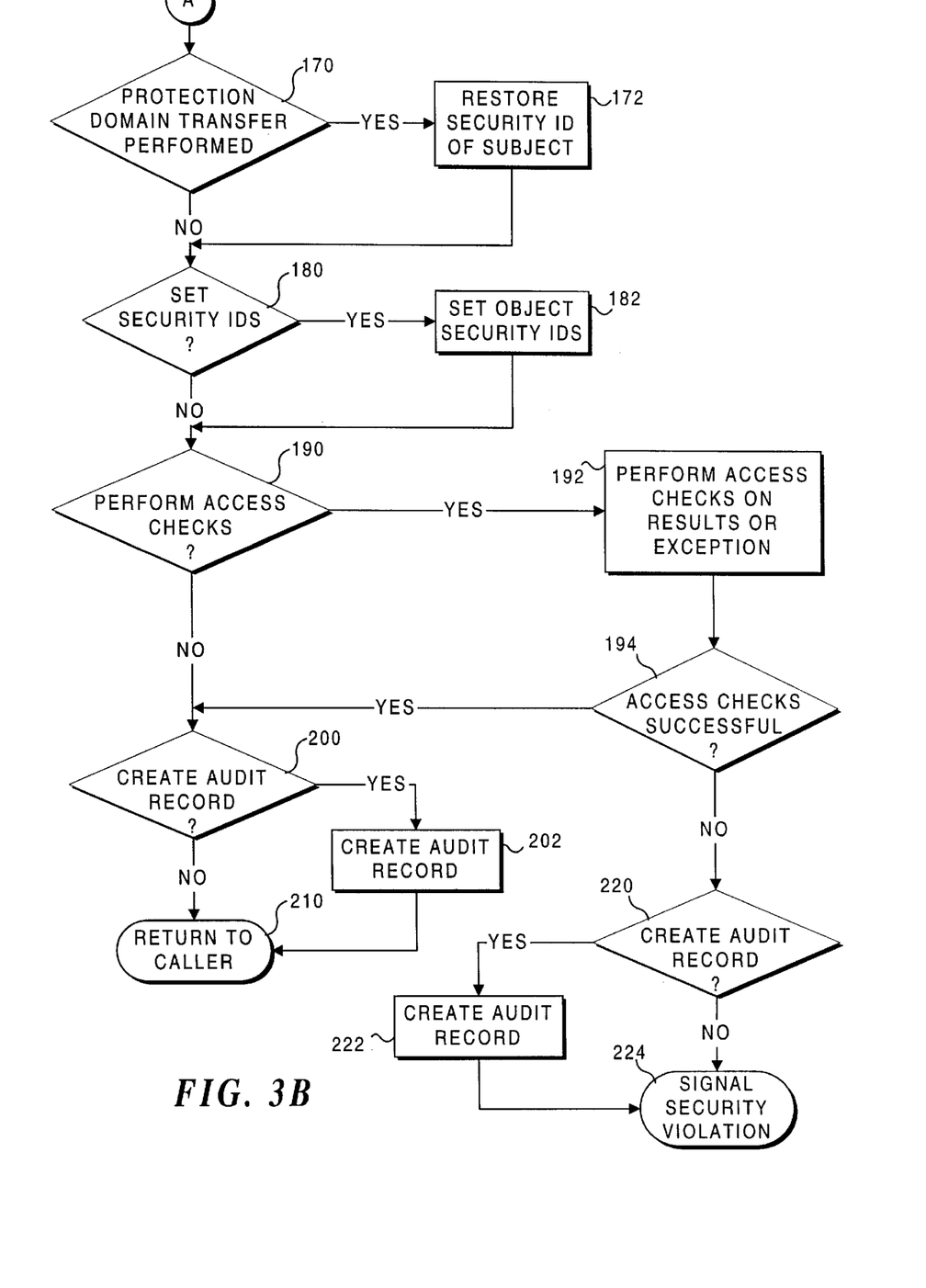

FIGS. 3A and 3B illustrate the control and data flow that occur when executing a component operation of the modified software component. A call is made to the component operation in a block 100. The modified software component invokes enforcement service 19 before the original component operation is executed. The enforcement service first determines whether it must associate component system objects with security identifiers, as indicated in a decision block 110. An affirmative response to decision block 110 leads to a block 112 in which the enforcement service establishes associations for the arguments with the component operation, as specified by the security operation that was injected into the software component by the interposition service as added code. The security IDs for a component system object can be specified in the security operation directly, for example, when associating a software component with a security identifier. Or, the security identifier can be that of another object, such as an argument of an operation. Furthermore, the security identifier can be a default object security identifier for the current protection domain, resulting in the enforcement service querying the security policy service for the current object default security identifier. As a further alternative, the security identifier can be associated with an object's name in a given name space, resulting in the enforcement service querying the security policy service for the security identifier associated with a given name.

A decision block 120 indicates that the enforcement service determines whether it is necessary to perform access checks when the modified software component is executed. If so, the enforcement service first checks whether the subject has the right to execute the code in the modified software component, generally as indicated in a block 122. The enforcement service performs this test by querying the security policy service with the security identifier of the subject and the security identifier of the software component. In response, the security policy service interprets the two security identifiers that it has been provided by the enforcement service according to its security policies, and returns the appropriate access mode. If this access mode includes the permission to execute the component code, which was specified as part of the injected security operation, the security check succeeds.

The enforcement service then performs access checks on each argument, or object, to be passed to the component operation. Each of these tests is made by querying the security policy service with the security identifier of the subject and the security identifier of the object to be checked. Again, the security policy service returns the appropriate access mode, and enforcement service 19 determines whether the returned access mode includes the specified access mode. If the returned access mode includes the specified access mode, then the check is successful. A decision block 124 determines if all pertinent access checks discussed above were successful, and if so, in a decision block 130, the enforcement service determines if it is necessary to perform a protection domain transfer. The determination in decision block 130 is also made if the enforcement service does not need to perform access checks, i.e., if the result in decision block 120 is negative. If a protection domain transfer is necessary, the enforcement service determines the new security identifier and changes the subject's security identifier accordingly, as noted in a block 132. In order to determine the new security identifier for the subject, the enforcement service queries the security policy service with the previous security identifier of the subject and with the security identifier of the component to be executed. The security policy service interprets the two security identifiers and returns the new security identifier for the subject.

Independent of whether the access checks were successful and of whether a protection domain transfer was necessary, the enforcement service determines if it should create an audit record. Specifically, if access checks were not successful in decision block 124, a decision block 160 provides for determining whether to create the audit record. Conversely, if it is not necessary to perform a protection domain transfer in decision block 130, or after a change of security ID is obtained for the subject in block 132, a decision block 140 determines whether the enforcement service should create an audit record. A positive response to either of decision blocks 140 or 160 causes an audit record to be created in a block 142 or in a block 162, respectively. In the event that an audit record is necessary, one is created that lists the component operation, its arguments, any access control checks, and their results, and a potential protection domain transfer is created and transferred to the security policy service.

If it was not necessary to create an audit record in decision block 160 (or if the audit record was created in block 162), a block 164 provides for the enforcement service to abort the component operation and to signal a security violation. However, in decision block 140, if it was not necessary to create an audit record (or following the creation of one), a block 150 provides for executing the original component operation.

After completing the original component operation, which may be either normal or exceptional, the enforcement service determines whether it was necessary to perform a protection domain transfer in a decision block 170 (FIG. 3B). Assuming that a protection domain transfer was executed in block 132 requiring a change in the security ID of the subject, the enforcement service restores the original security ID for the subject in a block 172. After either block 172 or obtaining a negative result in decision block 170, a decision block 180 determines if the enforcement service should associate component system objects, such as the results of an operation, with security identifiers. If it is necessary to set security identifiers for these component system objects, a block 182 carries out this step, which is similar to that carried out in block 112.

Following a negative determination in decision block 180 or after the security IDs are set for the objects in block 182, a decision block 190 determines whether it is appropriate to perform access checks and if so, performs the access checks on the results of the component operation or on any exceptions that have been identified, as provided in a block 192. Thus, the function implemented in block 192 is similar to that carried out above in block 122.

Following block 192, a decision block 194 determines if the access checks made in block 192 were successful, and if so, the procedure advances to a decision block 200. In decision block 200, a determination is made by the enforcement service as to whether it is necessary to create an audit record. Such a record would list the component operation, its arguments, its results or exceptions, any access control checks and their results, and indicate whether a protection domain transfer has been performed. The audit record is then created in a block 202. Even if the access checks were unsuccessful in decision block 194, a decision block 220 determines if an audit record should be created and if so, a block 222 provides for creating one. Following the creation of the audit record in block 222 or assuming that it was not necessary to complete such a record, a block 224 signals a security violation.

If it is not necessary to create the audit record in decision block 200 (or following creation of the audit record in block 202), a block 210 provides for returning to the calling routine. Upon returning to the calling program, either the results of the component operation are presented if it completed normally, or any exceptions raised by the component operation are presented if the component operation completed-exceptionally.

It will be noted that at several points in the description of the logic that occurs during a component operation, the enforcement service queries the security policy service with a pair of security identifiers, or with an object name, and is returned either another security identifier or an access mode. In one embodiment of the invention, the enforcement service includes a cache for storing the results of these queries to reduce the frequency with which the queries are subsequently performed. In this embodiment, the enforcement service first queries its cache to determine whether the desired information is already available in the cache. If so, the enforcement service uses the cached information instead of querying the security policy service. If the information required is not available within the cache, the enforcement service queries the security policy service. The security policy service determines for each query whether it can be cached by the enforcement service, and if so, the duration of the cached information. Further, the security policy service can revoke entries from this cache at any time. In decision blocks 110, 120, 130, 140, 160, 170, 180, 190, 200, and 220, the above logical flow requires that the enforcement service determine whether it has to take a specific step. However, a determination of whether the steps need be taken or not depends only on the security policy. Consequently, these tests do not have a different result unless the security policy changes. Furthermore, in one embodiment of the present invention, these tests are not executed dynamically by the enforcement service. Instead, the security policy service instructs the interposition service to only inject those security operations into a software component that strictly are required to be executed. However, it is contemplated that the tests might be executed dynamically.

Broadened Application of the Present Invention

From the preceding disclosure, it will be evident that the present invention readily enables administrators and users of computer systems to enforce site specific security policies on software components by applying access control, protection domains, and auditing trails. Furthermore, the present invention separates the enforcement of the site specific policies from the actual security policy, which is desirable, since it permits changes to be made in the security policy independent of the software components. The preceding disclosure includes a number of specific details, which should not be construed as a limitation on the scope of the invention, but rather as an exemplification of one or more preferred embodiments thereof. It is contemplated that many other variations are possible, such as those discussed below. These variations embody security enforcement through access control, protection domains, and auditing with a separate security policy specification, just as the above, but optionally also include or exclude certain steps disclosed above to better serve installation requirements and/or to reduce the cost of deployment, administration, or implementation of the invention.

For example, in one embodiment of the invention, the enforcement service and the security policy service, as well as the binary introspection and interposition services, are integrated into the software component system, i.e., they are implemented on the computer that will execute the modified software component. However, in an environment in which the same set of security policies applies to software components on several networked computers, a central server or a pool of replicated server computers may instead implement the security policy, binary introspection, and binary interposition services, while the enforcement service is present on each of the individual computers. In this manner, the resource requirements for the individual computers is reduced and the security management is centralized. Unfortunately, this approach will likely generate more network traffic, since the enforcement service on each networked computer needs to query the central security policy service. Accordingly, it may be preferable to include each of these services within each computer rather than employing a centralized server for one or more of the services.

In either a single computer or a distributed embodiment of the invention involving a plurality of computers/servers that implement the various services of the present invention, the introspection, interposition, and security services may be supplemented with a cache for software components. Such a cache would hold software components that are already processed by the introspection, interposition, and security services. If a component system attempts to load a software component and the modified version of the component is already present in the cache, the original component does not again need to be processed by the introspection, interposition, and security services. Instead, the cached modified software component can be employed. As a result, the overhead for loading and processing software components with the present invention is reduced. Such a cache can be especially effective when the same software components are repeatedly loaded into a component system, e.g., when several component systems in a distributed embodiment access the same components, or when components are processed before they are loaded by a component system, such as by prefetching software components, since related software components are frequently loaded in direct succession.

In another embodiment of the present invention, a system management policy rather than a security policy may be specified for modifying an original software component. System management policies are often defined to introduce side effects into basic operations performed by programs. For example, one system management policy might be intended to count all occurrences of a certain operation as it occurs during the execution of a program, and to report that count to a centralized computer or server when the program terminates. Other system management policies might involve version control mechanisms, or software metering for billing purposes. It is contemplated that these policies might be specified and enforced using the present invention, since the nature of the policies that are used for rewriting the software component do not in any way limit the scope of the present invention.

Preferably, the memory or type safety of software components is insured by the introspection service, and an interposition service for software components is available. If either of these two services is absent, another embodiment of the invention can execute all software components as individual programs on the local computer and interpose onto the interprocess communication to enforce access control, protection domains, and auditing. In such a case, the present invention can not only be used to enforce security on software components, but also on computer programs in general. It is further contemplated that the present invention could be used to enforce access control, protection domains, and auditing on interprocess communication as well as software component interaction and thus, can be used to augment the security services of a local computer's operating system and to provide consistent security services across all executable code on the local computer.

Computer System Suitable for Implementing the Present Invention

Figure 4:
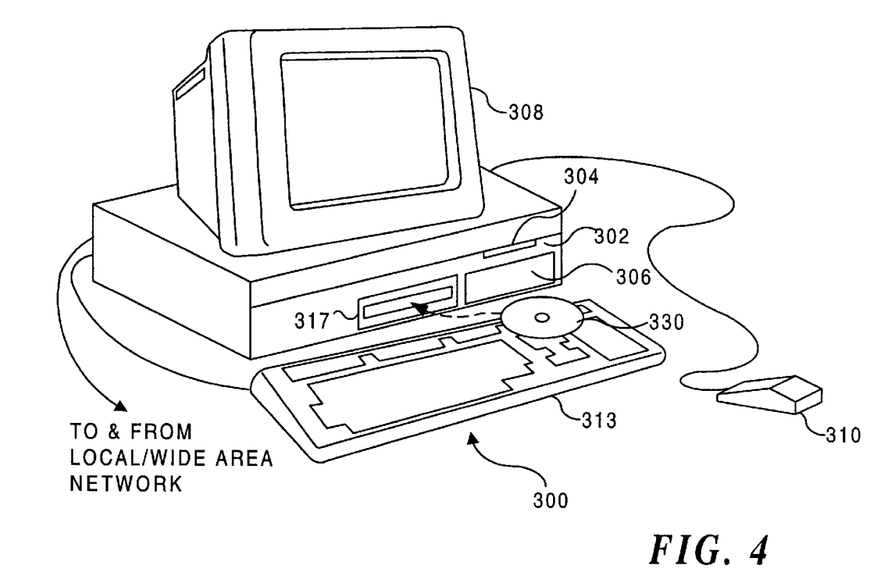
FIG. 4 is a schematic diagram of a conventional personal computer suitable for practicing the present invention.

With reference to FIG. 4, a generally conventional personal computer 300 is illustrated, which is suitable for use in connection with practicing the present invention. Alternatively, a portable computer, or workstation coupled to a network, and a server may instead be used. It is also contemplated that the present invention can be implemented on a non-traditional computing device that includes only a processor, a memory, and supporting circuitry.

Many of the components of the personal computer discussed below are generally similar to those used in each alternative computing device on which the present invention might be implemented, however, a server is generally provided with substantially more hard drive capacity and memory than a personal computer or workstation, and generally also executes specialized programs enabling it to perform the functions of a server. Personal computer 300 includes a processor chassis 302 in which are mounted a floppy disk drive 304, a hard drive 306, a motherboard populated with appropriate integrated circuits (not shown), and a power supply (also not shown), as are generally well known to those of ordinary skill in the art. A monitor 308 is included for displaying graphics and text generated by software programs that are run by the personal computer. A mouse 310 (or other pointing device) is connected to a serial port (or to a bus port) on the rear of processor chassis 302, and signals from mouse 310 are conveyed to the motherboard to control a cursor on the display and to select text, menu options, and graphic components displayed on monitor 308 by software programs executing on the personal computer. In addition, a keyboard 313 is coupled to the motherboard for user entry of text and commands that affect the running of software programs executing on the personal computer.

Personal computer 300 also optionally includes a compact disk-read only memory (CD-ROM) drive 317 into which a CD-ROM disk 330 may be inserted so that executable files and data on the disk can be read for transfer into the memory and/or into storage on hard drive 306 of personal computer 300. Personal computer 300 may implement the present invention in a stand-alone capacity, or may be coupled to a local area and/or wide area network as one of a plurality of such computers on the network that access one or more servers.

Figure 5:
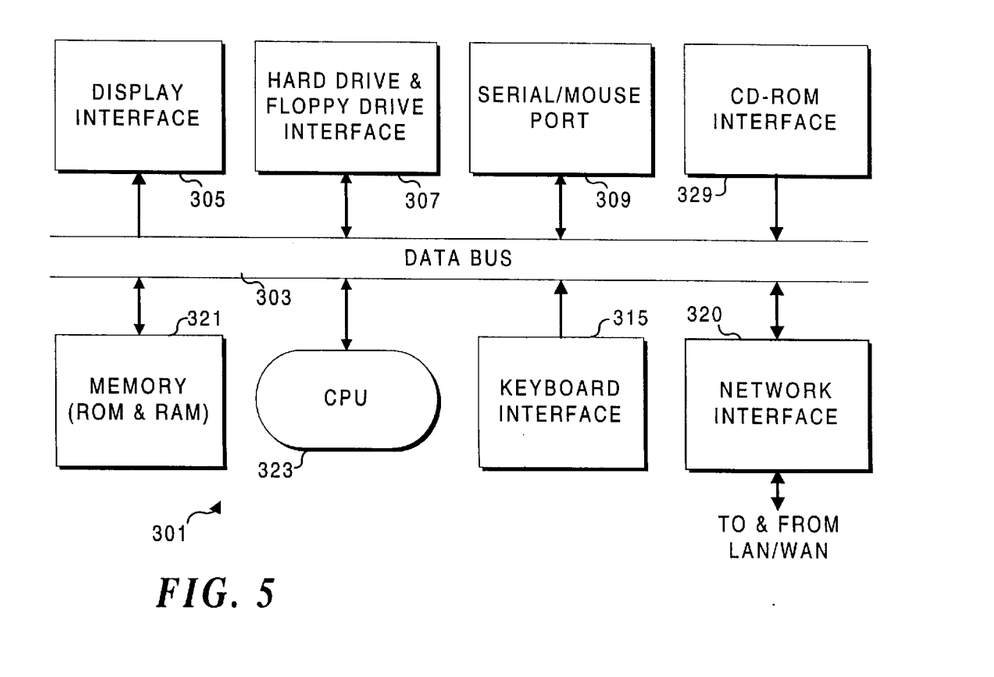
FIG. 5 is a schematic block diagram showing some of the functional components that are included within the processor chassis of the personal computer shown in FIG. 4.

Although details relating to all of the components mounted on the motherboard or otherwise installed inside processor chassis 302 are not illustrated, FIG. 5 is a block diagram showing some of the functional components that are included. The motherboard has a data bus 303 to which these functional components are electrically connected. A display interface 305, comprising a video card, for example, generates signals in response to instructions executed by a central processing unit (CPU) 323 that are transmitted to monitor 308 so that graphics and text are displayed on the monitor. A hard drive and floppy drive interface 307 is coupled to data bus 303 to enable bi-directional flow of data and instructions between the data bus and floppy drive 304 or hard drive 306. Software programs executed by CPU 323 are typically stored on either hard drive 306, or on a floppy disk (not shown) that is inserted into floppy drive 304. The software instructions for implementing the present invention will likely be distributed either on floppy disks, or on a CD-ROM disk or some other portable memory storage medium. The machine instructions comprising the software application that implements the present invention will also be loaded into the memory of the personal computer for execution by CPU 323. However, it is also contemplated that these machine instructions may be stored on a server for an organization and accessible for execution by computing devices coupled to the server, or might even be stored in ROM of the computing device.

A serial/mouse port 309 (representative of the two serial ports typically provided) is also bi-directionally coupled to data bus 303, enabling signals developed by mouse 310 to be conveyed through the data bus to CPU 323. It is also contemplated that a universal serial bus (USB) port may be included and used for coupling a mouse and other peripheral devices to the data bus. A CD-ROM interface 329 connects CD-ROM drive 317 to data bus 303. The CD-ROM interface may be a small computer systems interface (SCSI) type interface or other interface appropriate for connection to an operation of CD-ROM drive 317.

A keyboard interface 315 receives signals from keyboard 313, coupling the signals to data bus 303 for transmission to CPU 323. Optionally coupled to data bus 303 is a network interface 320 (which may comprise, for example, an ETHERNET™ card for coupling the personal computer or workstation to a local area and/or wide area network).

When a software program such as that used to implement the present invention is executed by CPU 323, the machine instructions comprising the program that are stored on a floppy disk, a CD-ROM, the server, or on hard drive 306 are transferred into a memory 321 via data bus 303. These machine instructions are executed by CPU 323, causing it to carry out functions determined by the machine instructions. Memory 321 includes both a nonvolatile read only memory (ROM) in which machine instructions used for booting up personal computer 300 are stored, and a random access memory (RAM) in which machine instructions and data defining an array of pulse positions are temporarily stored.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for modifying a software component to conform to predefined security and access policies, which may include collecting measurement information relating to the execution of the software component, comprising the steps of:
   (a) providing a set of security and access policies that may be applicable during the execution of the software component;
   (b) analyzing the software component to determine prior to its execution if any of the security and access policies are applicable to the software component;
   (c) modifying operations of the software component as necessary to conform it and its execution to the security and access policies, producing a modified software component; and
   (d) enforcing the security and access policies on the modified software component during its execution.

2. The method of claim 1, wherein the step of analyzing includes the step of parsing code comprising the software component to determine abstractions or object types supported thereby, and the operation of said abstractions or object types.

3. The method of claim 2, wherein the step of analyzing further includes the steps of determining any authorization information for the software component; and, based on the abstractions or object types, operations on said abstractions or object types, and the authorization information, determining each security and access policy that is applicable to the software component.

4. The method of claim 3, further comprising the step of determining the operations that require at least one of an access control check, a protection domain transfer, and auditing.

5. The method of claim 2, wherein the step of modifying comprises the steps of adding a security initialization code to the software component; and, imposing security operations on the operation of the software component consistent with the security and access policies.

6. The method of claim 5, wherein the security operations indicate how to associate component system objects with security identifiers, and when and how to perform access checks, protection domain transfers, and auditing.

7. The method of claim 1, wherein if the set of security and access policies is revised, further comprising the step of changing the modified software component to provide a new modified software component that incorporates changes consistent with the revised set of security and access policies.

8. The method of claim 1, further comprising the step of authenticating a user prior to permitting the user to execute the modified software component.

9. The method of claim 8, wherein during execution of the software component, if a new thread of control is detected, a security identifier for a subject is identified and an association between the subject and its security identifier is registered to facilitate enforcement of the security and access policies.

10. The method of claim 1, wherein the step of enforcing the security and access policies includes the step of invoking an enforcement service before the software component is executed, said enforcement service determining whether it is necessary to associate a component system object with a security identifier, and if so, establishing an association between the component system object and the security identifier.

11. The method of claim 10, wherein the step of enforcing further comprises the step of the enforcement service determining whether access checks should be performed on the modified software component prior to permitting it to execute, and if said access checks are not successful, the enforcement service precludes the modified software component from executing.

12. The method of claim 10, wherein the step of enforcing further comprises the steps of the enforcement service determining whether a protection domain transfer is required, and if so, determining a new security identifier for a subject.

13. The method of claim 1, further comprising the step of creating an audit record during the execution of the modified software component.

14. The method of claim 1, further comprising the step of providing a cache that temporarily stores data previously obtained from referencing the security policies relating to the software component, to make said data more readily available during the step of enforcing the security and access policies.

15. The method of claim 14, wherein the data stored within the cache indicates at least one of an association between a security identifier and an object of the software component, between a security identifier and an access mode, and between a security identifier and a name, said data being determined by reference to the security and access policies.

16. The method of claim 1, further comprising the step of storing the modified software component in a cache to enable it to be loaded from the cache and executed when the software component again needs to be executed, so that it is not necessary to reproduce the modified software component.

17. The method of claim 1, wherein the security and access policies define how the software component is modified to enable the information related to its execution to be collected, further comprising the step of collecting the information related to the execution of the modified software component.

18. A computer system that enables modification of a software component to conform to predefined security and access policies prior to execution of the software component, where said security and access policies may include collecting measurement information related to execution of the software component, comprising:
 (a) at least one memory in which a plurality of machine instructions and a set of security and access policies are stored; and
 (b) at least one processor that communicates with said at least one memory and which executes the machine instructions to implement a plurality of functions, said functions being implemented by one or more different processors comprising the computer system and including:
  (i) accessing the set of security and access policies stored in the memory;
  (ii) analyzing the software component to determine prior to its execution if any of the security and access policies are applicable to the software component;
  (iii) modifying operations of the software component as necessary to conform it and its execution to the security and access policies, producing a modified software component; and
  (iv) enforcing the security and access policies on the modified software component during its execution.

19. The computer system of claim 18, wherein a processor included in one of the computer system and a different computer system executes the modified software component.

20. The computer system of claim 18, wherein the modified software component is executed by a different processor disposed in a computer that is different than that in which a processor that implements at least some of functions (i) through (iv) is disposed.

21. The computer system of claim 18, wherein the software instructions cause a processor to parse code comprising the software component to determine abstractions or object types supported thereby, and the operation of said abstractions or object types.

22. The computer system of claim 20, wherein the machine instructions further cause a processor to determine any authorization information for the software component; and, based on the abstractions or the object types, operations of the abstractions or the object types, and the authorization information, to determine each security policy that is applicable to the software component.

23. The computer system of claim 22, wherein the machine instructions further cause a processor to determine the operations performed by the software component that require at least one of an access control check, a protection domain transfer, and auditing.

24. The computer system of claim 21, wherein a security initialization code is added to the software component when the software component is modified by a processor, and security operations are imposed on the operation of the software component consistent with the security and access policies.

25. The computer system of claim 24, wherein while analyzing the software component, a processor associates component system objects with security identifiers, and the security operations indicate when and how to perform access checks, protection domain transfers, and auditing during execution of the software component.

26. The computer system of claim 18, wherein if the set of security and access policies is revised, the machine instructions cause a processor to further modify the modified software component so that a new modified software component is created that incorporates changes consistent with the revised set of security and access policies.

27. The computer system of claim 18, wherein the machine instructions cause a processor to authenticate a user prior to permitting the user to execute the modified software component.

28. The computer system of claim 27, wherein during execution of the software component, if a new thread of control is detected by a processor, a security identifier for a subject is identified and an association between the subject and its security identifier are registered to facilitate enforcement of the security and access policies.

29. The computer system of claim 18, wherein to enforce the security and access policies, an enforcement service is invoked before the software component is executed, said enforcement service determining whether it must associate a component system object with a security identifier, and if so, establishing an association between the component system object and the security identifier.

30. The computer system of claim 29, wherein the enforcement service determines whether access checks should be performed on the modified software component prior to permitting it to execute, and if said access checks are not successful, the enforcement service precludes the modified software component from executing.

31. The computer system of claim 29, wherein the enforcement service determines whether a protection domain transfer is required, and if so, determines a new security identifier for a subject.

32. The computer system of claim 18, wherein the machine instructions further cause a processor to create an audit record during the execution of the modified software component.

33. The computer system of claim 18, wherein the machine instructions further cause a processor to provide a cache in the memory that temporarily stores data previously obtained from referencing the security and access policies relating to the software component, said cache making said data more readily available for enforcing the security and access policies.

34. The computer system of claim 33, wherein the data stored within the cache provides at least one of an association between a security identifier and an object of the software component, between a security identifier and an access mode, and between a security identifier and a name, said data being provided by reference to the security and access policies.

35. The computer system of claim 18, wherein the machine instructions further cause a processor to provide a cache in the memory that stores the modified software component once it is produced, so that subsequently when the software component must again be executed, the modified software component can be loaded from the cache for execution, avoiding the need to again produce the modified software component.

36. The computer system of claim 18, wherein the machine instructions further cause a processor to modify the software component to enable information related to the execution of the modified software component to be collected.

* * * * *

UNITED STATES PATENT AND TRADEMARK OFFICE
CERTIFICATE OF CORRECTION

PATENT NO. : 6,317,868 B1
DATED : November 13, 2001
INVENTOR(S) : Grimm et al.

It is certified that error appears in the above-identified patent and that said Letters Patent is hereby corrected as shown below:

<u>Column 1,</u>
Line 8, please delete the word "of"
Line 13, please add the following section:
--                    Government Rights
  This invention was made with government support under N00014-94-1-1136 awarded by the U.S. Navy. The government has certain rights in the invention. --
Line 33, "it" should read -- is --

Signed and Sealed this

Second Day of April, 2002

Attest:

JAMES E. ROGAN
*Attesting Officer*   *Director of the United States Patent and Trademark Office*